(12) United States Patent
Oehme

(10) Patent No.: US 7,690,734 B2
(45) Date of Patent: Apr. 6, 2010

(54) BRAKE STEERING METHOD AND APPARATUS

(75) Inventor: Clifford H. Oehme, Avon, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 939 days.

(21) Appl. No.: 11/333,078

(22) Filed: Jan. 17, 2006

(65) Prior Publication Data

US 2007/0164603 A1     Jul. 19, 2007

(51) Int. Cl.
  *B60T 13/66*      (2006.01)
(52) U.S. Cl. .................. 303/9.61; 180/6.3; 180/6.44; 180/6.7; 188/106 P
(58) Field of Classification Search .............. 303/9, 303/9.61, 122, 122.09, 122.15; 180/6.2, 180/6.24, 6.26, 6.3, 6.7, 6.44; 188/106 P
See application file for complete search history.

(56) References Cited

U.S. PATENT DOCUMENTS 4,702,358 A * 10/1987 Mueller et al. ............... 180/6.7

| | | | |
|---|---|---|---|
| 6,527,070 B2 * | 3/2003 | Ryan ........................... | 180/6.7 |
| 6,782,960 B2 * | 8/2004 | Kanzler et al. .............. | 180/6.62 |
| 6,935,445 B2 * | 8/2005 | Johnson ....................... | 180/6.3 |
| 2002/0050739 A1 * | 5/2002 | Koepff et al. .......... | 303/122.09 |

* cited by examiner

*Primary Examiner*—Thomas J Williams
(74) *Attorney, Agent, or Firm*—Quinn Law Group, PLLC

(57) ABSTRACT

The present invention provides a method and apparatus for brake steering a tracked vehicle such as, for example, a military tank. More precisely, the present invention provides independent control of a left brake and a right brake to create a track speed differential and thereby turn the vehicle. The apparatus of the present invention preferably includes a controller, a plurality of circuit selector actuators operatively connected to the controller, and a plurality of brake apply actuators operatively connected to the controller. A plurality of valves are disposed in fluid communication with the plurality of circuit selector actuators. The left brake is in fluid communication with one of the plurality of brake apply actuators, and the right brake is in fluid communication with another of the plurality of brake apply actuators. The controller is configured to control the plurality of brake apply actuators to independently apply the left brake and the right brake such that the tracked vehicle can be turned in a desired manner.

11 Claims, 3 Drawing Sheets

BRAKE STEERING METHOD AND APPARATUS

TECHNICAL FIELD

The present invention is drawn to a brake steering method and apparatus for a tracked vehicle.

BACKGROUND OF THE INVENTION

For purposes of the present invention, tracked vehicles are defined as vehicles that ride on tracks instead of or in addition to wheels, such as, for example, military tanks. When the primary steering system of a tracked vehicle fails, it is generally necessary to safely bring the vehicle to a stop. In order to safely stop the tracked vehicle it may be necessary to steer the tracked vehicle while it is being stopped if, for example, the tracked vehicle was executing a turn when the primary steering system failed.

SUMMARY OF THE INVENTION

The present invention provides a method and apparatus for brake steering a tracked vehicle. According to a preferred embodiment, the present invention is implemented to safely bring a tracked vehicle to a stop when a primary steering system fails. It should be appreciated, however, that the method of the present invention may alternatively be implemented as a backup to the primary steering system such that the tracked vehicle can steer without necessarily bringing it to a stop.

The apparatus of the present invention includes a controller, a circuit selector actuator operatively connected to the controller, and a plurality of brake apply actuators operatively connected to the controller. A valve is disposed in fluid communication with the circuit selector actuator, and is configured to select a predefined operational mode. A left brake is in fluid communication with one of the plurality of brake apply actuators, and a right brake is in fluid communication with another of the plurality of brake apply actuators. The controller is configured to control the plurality of brake apply actuators to independently apply the left brake and the right brake such that the vehicle can be turned in a desired manner.

The method of the present invention initially includes identifying a failure of a primary steering system. Primary steering system failure may be identified, for example, by receipt of a signal from the vehicle operator or from on-board diagnostic equipment. After a primary steering system failure has been identified, a circuit selector actuator is controlled to select a predefined operational mode of the hydraulic brake system. The controller then preferably calculates a track speed differential adapted to produce a desired turn of the vehicle. Thereafter, a plurality of brake apply actuators are controlled to apply the left brake and/or the right brake by an amount calculated to produce the desired track speed differential.

According to an alternate embodiment, the present invention also provides a method for correcting a brake system failure of a tracked vehicle. This method includes identifying a failure of a first brake apply actuator. A failure of the brake apply actuator may be identified, for example, by receipt of a signal from the vehicle operator or from on-board diagnostic equipment. After identifying a failure of the first brake apply actuator, a predefined operational mode is commanded. A circuit selector actuator is then controlled to actuate a valve assembly such that the failed first brake apply actuator is functionally disconnected from the brake system and a second brake apply actuator is accessible to the brake system to replace the failed first brake apply actuator. The second brake apply actuator is thereafter controlled to selectively transfer hydraulic fluid and thereby evenly apply a left brake and a right brake of the tracked vehicle.

According to one aspect of the invention, the apparatus includes a reservoir in fluid communication with the circuit selector actuators; the plurality of brake apply actuators; the left brake; and the right brake, and a pump configured to provide pressurized hydraulic fluid from the reservoir to one or more of the circuit selector actuators, the plurality of brake apply actuators, the left brake, and the right brake.

According to another aspect of the invention, the circuit selector actuator and the plurality of brake apply actuators are solenoids.

According to yet another aspect of the invention, the apparatus includes a left brake regulator inlet port operatively connected to the left brake, and a right brake regulator inlet port operatively connected to the right brake.

According to still another aspect of the invention, the method includes implementing closed loop control to maintain the track speed differential.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
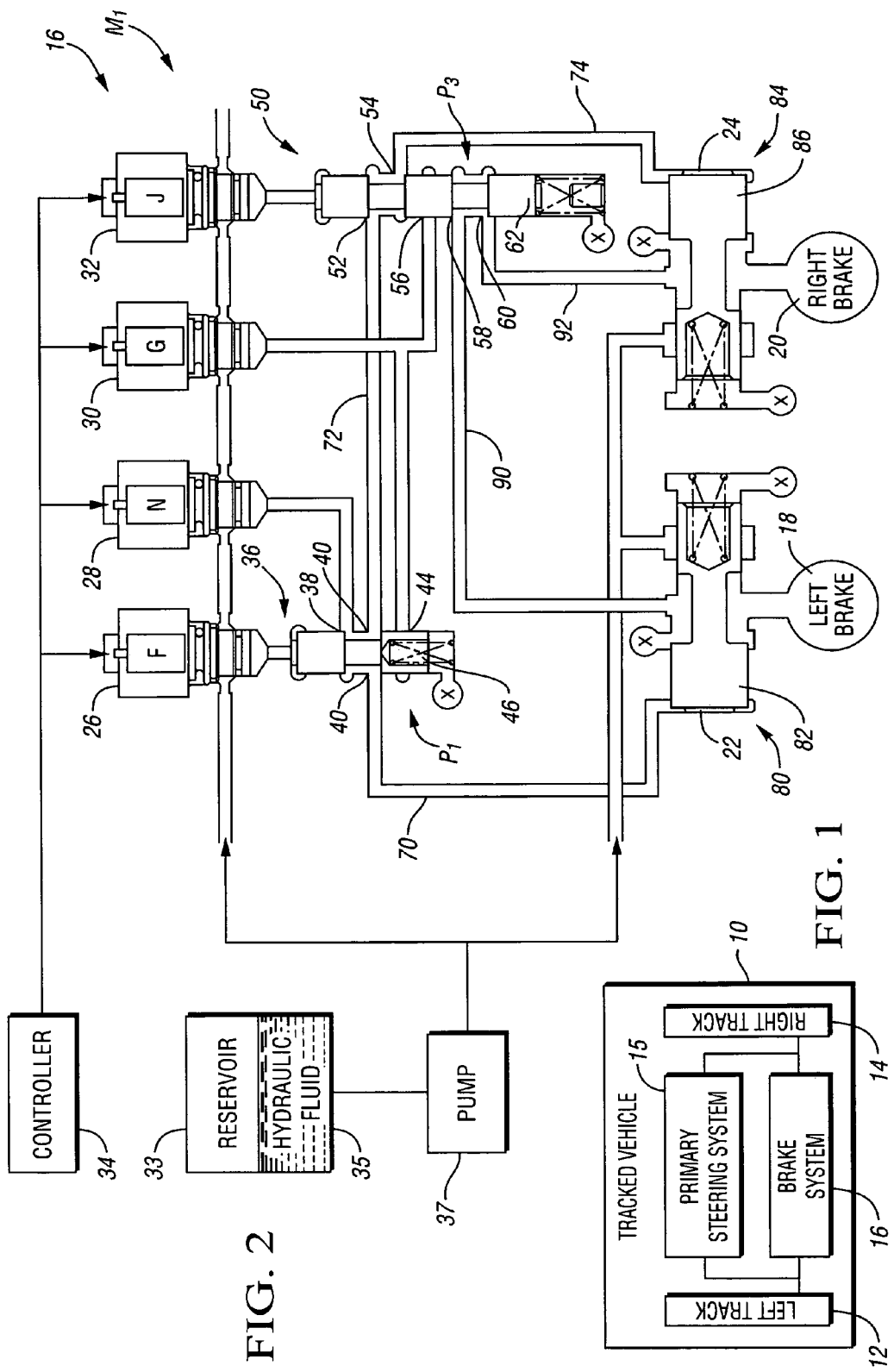
FIG. 1 is a schematic diagram of a tracked vehicle according to the present invention.
FIG. 2 is a schematic diagram of a tracked vehicle braking system in a first operational mode.

Referring to the drawings, wherein like reference numbers refer to like components, FIG. 1 shows a schematic depiction of a tracked vehicle 10 having a left track 12, a right track 14, a primary steering system 15, and a hydraulic brake system 16 operatively connected to the tracks 12, 14. For purposes of the present invention, tracked vehicles are defined as vehicles that ride on tracks instead of or in addition to wheels, such as, for example, military tanks.

Referring to FIG. 2, the hydraulic brake system 16 is shown in more detail. The hydraulic brake system 16 preferably includes a left brake 18 adapted to slow the left track 12 (shown in FIG. 1), and a right brake 20 adapted to slow the right track 14 (shown in FIG. 1). The hydraulic brake system also includes four actuators 26, 28, 30 and 32, and a controller 34 adapted to control the actuators 26, 28, 30 and 32. According to a preferred embodiment, the actuators 26 and 32 are circuit selector solenoids, and the actuators 28 and 30 are brake apply solenoids. A pump 37 selectively transfers pressurized hydraulic fluid 35 from a reservoir 33 to the solenoids 26, 28, 30 and 32, a left brake regulator inlet port 22, and a right brake regulator inlet port 24.

The hydraulic brake system 16 includes a left brake regulator valve 80 having a control piston 82, and a right brake regulator valve 84 having a control piston 86. Application of hydraulic pressure to the left brake regulator inlet port 22 will axially translate the control piston 82 such that pressurized hydraulic fluid 35 from the reservoir 33 is transferable through the left brake regulator valve 80 to actuate the left brake 18. Similarly, application of hydraulic pressure to the right brake regulator inlet port 24 will axially translate the control piston 86 such that pressurized hydraulic fluid 35 from the reservoir 33 is transferable through the right brake regulator valve 84 to actuate the right brake 20.

The application force of the left and right brakes 18, 20 may be independently varied by controlling the pressure of hydraulic fluid 35 transferred to the left and right brake regulator inlet ports 22, 24, respectively. It should be appreciated by one skilled in the art that the tracked vehicle 10 (shown in FIG. 1) may be turned by applying different brake loads to the left and right tracks 12, 14 (shown in FIG. 1). For example, applying a greater brake force to the right track 14 than the left track 12 generally turns the vehicle 10 to the right. Conversely, applying a greater brake force to the left track 12 than the right track 14 generally turns the vehicle 10 to the left.

A selector valve assembly 36 is disposed in fluid communication with the solenoid 26. The controller 34 may selectively actuate the solenoid 26 to control the operation of the selector valve assembly 36 as will be described in detail hereinafter. The selector valve assembly 36 includes three inlet/outlet ports 38, 40 and 44, and a control piston 46. Transfer of pressurized hydraulic fluid 35 from the solenoid 26 to the selector valve assembly 36 translates the control piston 46 from a steady state position P1 to an actuated position P2 (shown in FIG. 4). When the control piston 46 is in its steady state position P1, inlet port 38 is in fluid communication with outlet port 40, and inlet port 44 is closed. When the control piston 46 is in its actuated position P2, inlet port 44 is in fluid communication with outlet port 40, and inlet port 38 is closed.

A splitter valve assembly 50 is disposed in fluid communication with the solenoid 32. The controller 34 may selectively actuate the solenoid 32 to control the operation of the splitter valve assembly 50 as will be described in detail hereinafter. The splitter valve assembly 50 includes five inlet/outlet ports 52, 54, 56, 58 and 60, and a control piston 62. Transfer of pressurized hydraulic fluid 35 from the solenoid 32 to the splitter valve assembly 50 translates the control piston 62 from a steady state position P3 to an actuated position P4 (shown in FIG. 3). When the control piston 62 is in its steady state position P3, inlet port 52 is in fluid communication with outlet port 54, inlet/outlet port 58 is in fluid communication with inlet/outlet port 60, and inlet port 56 is closed. When the control piston 62 is in its actuated position P4, inlet port 56 is in fluid communication with outlet port 54, inlet port 52 is closed, and inlet/outlet port 58 is closed such that fluid communication between inlet/outlet ports 58 and 60 is blocked.

The inlet port 38 of the selector valve assembly 36 is in fluid communication with the solenoid 28. The outlet port 40 of the selector valve assembly 36 is in fluid communication with the left brake regulator inlet port 22 via a left apply channel 70. The outlet port 40 of the selector valve assembly 36 is also in fluid communication with the inlet port 52 of the splitter valve assembly 50 via a connector channel 72. The inlet port 44 of the selector valve assembly 36 is in fluid communication with the solenoid 30.

The inlet port 52 of the splitter valve assembly 50 is in fluid communication with the outlet port 40 of the selector valve assembly 36 via the connector channel 72. The outlet port 54 of the splitter valve assembly 50 is in fluid communication with the right brake regulator inlet port 24 via a right apply channel 74. The inlet port 56 of the splitter valve assembly 50 is in fluid communication with the solenoid 30. The inlet/outlet port 58 is operatively connected to the left brake regulator valve 80 via equalization channel 90, and the inlet/outlet port 60 is operatively connected to the right brake regulator valve 84 via equalization channel 92.

When the primary steering system 15 (shown in FIG. 1) of the vehicle 10 (shown in FIG. 1) is functional, the hydraulic brake system 16 preferably operates in a first operational mode M1 shown in FIG. 2. The first operational mode M1 is generally the default mode, and the hydraulic brake system 16 preferably operates in mode M1 unless otherwise commanded by the controller 34. In mode M1, the control piston 46 of the selector valve assembly 36 is in the steady state position P1, and the control piston 62 of the splitter valve assembly 50 is in the steady state position P3.

In the first operational mode M1 of the hydraulic brake system 16, the solenoid 28 controls both the left and right brakes 18, 20. More precisely, the solenoid 28 transfers pressurized hydraulic fluid 35 into the inlet port 38 of the selector valve assembly 36; through the selector valve assembly 36; and out of the outlet port 40 of the selector valve assembly 36. The pressurized hydraulic fluid 35 transferred out of the outlet port 40 is transferred via the left apply channel 70 to the left brake regulator inlet port 22 to actuate the left brake 18. The pressurized hydraulic fluid 35 transferred out of the outlet port 40 is also transferred through the connector channel 72; into the inlet port 52 of the splitter valve assembly 50; out of the outlet port 54 of the splitter valve assembly 50; through the right apply channel 74; and to the right brake regulator inlet port 24 such that the right brake 20 is actuated.

As shown in FIG. 2, the inlet/outlet ports 58 and 60 are in fluid communication with each other and thereby establish fluid communication between the left and right brake regulator valves 80, 84 via the equalization channels 90, 92 to equalize any pressure differential between the left and right brakes 18, 20. Therefore, in the first operational mode M1 of the hydraulic brake system 16, the solenoid 28 transfers pressurized hydraulic fluid 35 to both the left and right brake regulator inlet ports 22, 24 at a common pressure such that the left and right brakes 18, 20 generate a substantially similar brake force respectively applied to the left and right tracks 12, 14 (shown in FIG. 1).

Figure 3:
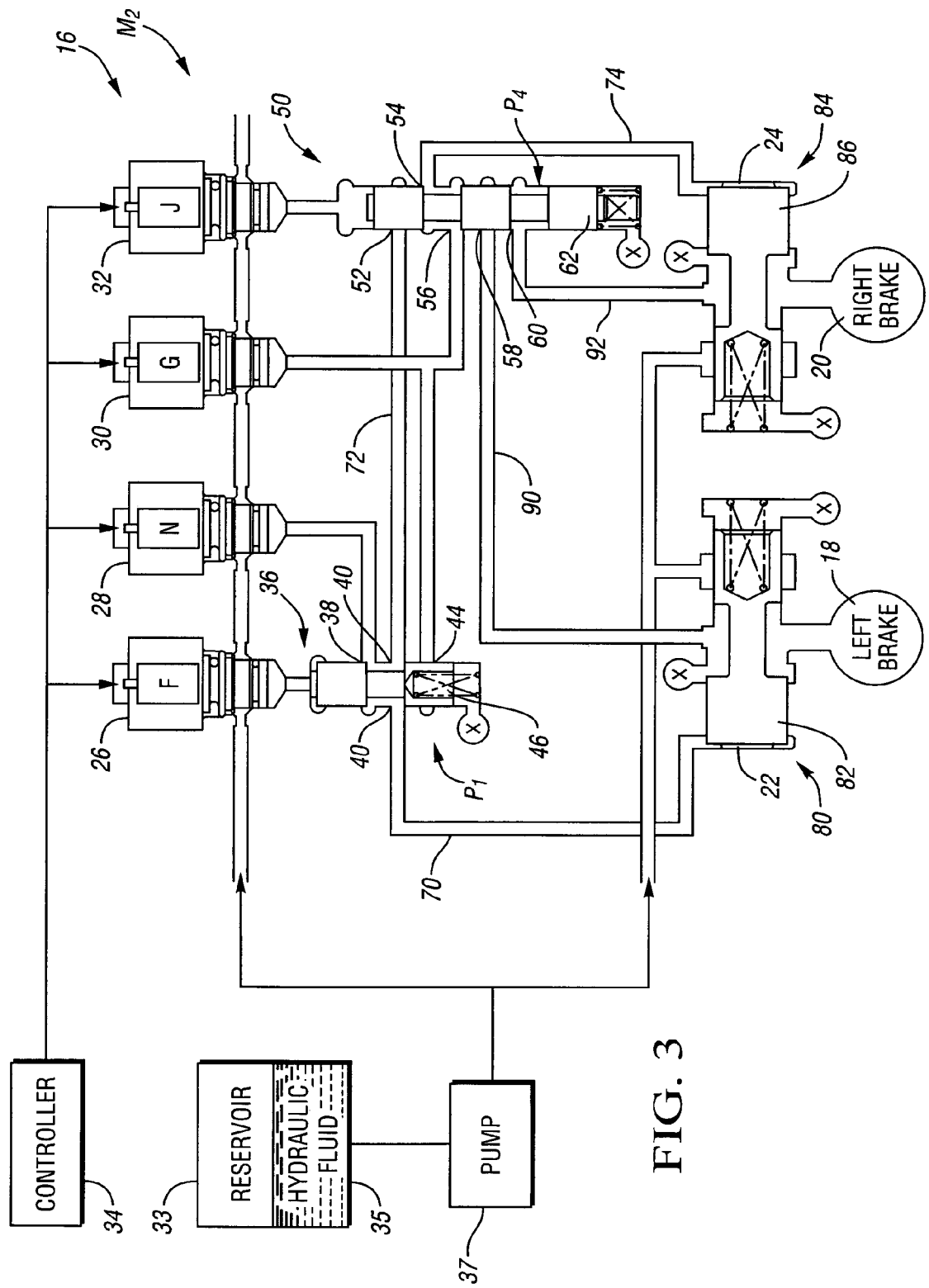
FIG. 3 is a schematic diagram of a tracked vehicle braking system in a second operational mode.

When the primary steering system 15 (shown in FIG. 1) of the vehicle 10 (shown in FIG. 1) is not functional, the hydraulic brake system 16 preferably operates in a second operational mode M2 shown in FIG. 3. Failure of the primary steering system 15 may be identified, for example, by the controller 34 in response to a signal from the vehicle operator or from on-board diagnostic equipment (not shown). In mode M2, the solenoid 26 is off such that the control piston 46 of the selector valve assembly 36 remains in the steady state position P1, and the solenoid 32 transmits pressurized hydraulic fluid 35 to actuate the splitter valve assembly 50 such that the control piston 62 is translated into the actuated position P4.

In the second operational mode M2 of the hydraulic brake system 16, the solenoid 28 controls the left brake 18, and the solenoid 30 independently controls the right brake 20. More precisely, the solenoid 28 transfers pressurized hydraulic fluid 35 into the inlet port 38 of the selector valve assembly 36; through the selector valve assembly 36; out of the outlet port 40 of the selector valve 36; through the left apply channel 70; and to the left brake regulator inlet port 22 such that the left brake 18 is applied. The solenoid 30 transfers pressurized hydraulic fluid 35 into the inlet port 56 of the splitter valve assembly 60; through the splitter valve assembly 60; out of the outlet port 54 of the splitter valve assembly 60; through the right apply channel 74; and to the right brake regulator inlet port 24 such that that the right brake 20 is applied.

As shown in FIG. 3, the inlet/outlet port 58 is closed to block fluid communication between inlet/outlet ports 58, 60 and thereby enable a pressure differential between the left and right brakes 18, 20. Therefore, in the second operational mode M2 of the hydraulic brake system 16, the solenoid 28 transfers pressurized hydraulic fluid 35 to the left brake regulator inlet port 22, and the solenoid 30 independently transfers pressurized hydraulic fluid 35 to the right brake regulator inlet port 24 such that the application force of the left and right brakes 18, 20 is independently controllable. The application forces applied by the left and right brakes 18, 20 may be independently varied by controlling the pressure of hydraulic fluid 35 respectively transferred by the solenoids 28, 30 to the left and right brake regulator inlet ports 22, 24. As previously stated, the tracked vehicle 10 (shown in FIG. 1) may be turned by applying different brake loads to the left and right tracks 12, 14 (shown in FIG. 1) in the manner described hereinabove. Therefore, when the primary steering system 15 (shown in FIG. 1) of the vehicle 10 is not functional, the tracked vehicle 10 may be slowed down and/or turned according to the method of the present invention.

To turn the tracked vehicle 10 (shown in FIG. 1), the controller 34 preferably calculates the required track speed differential to perform a desired turn, and thereafter generates a brake command configured to produce the required track speed differential. The track speed differential is defined as the difference between the speed of the left track 12 (shown in FIG. 1) and the speed of the right track 14 (shown in FIG. 1). The brake command is a command controlling the operation of the solenoids 28, 30 in a manner adapted to generate the brake force required to turn the tracked vehicle 10. As an example, the controller 34 would command the solenoid 30 to apply maximum pressure and fully apply the right brake 20 in response to a 100% right hand turn request at zero average vehicle speed. As the level of steer input is decreased, the amount of left or right brake apply commanded by the controller 34 correspondingly decreases resulting in increasing turning radius and increasing average vehicle speed. According to a preferred embodiment, the controller 34 implements closed loop control to maintain the required track speed differential based on driver steer input and average vehicle speed.

Figure 4:
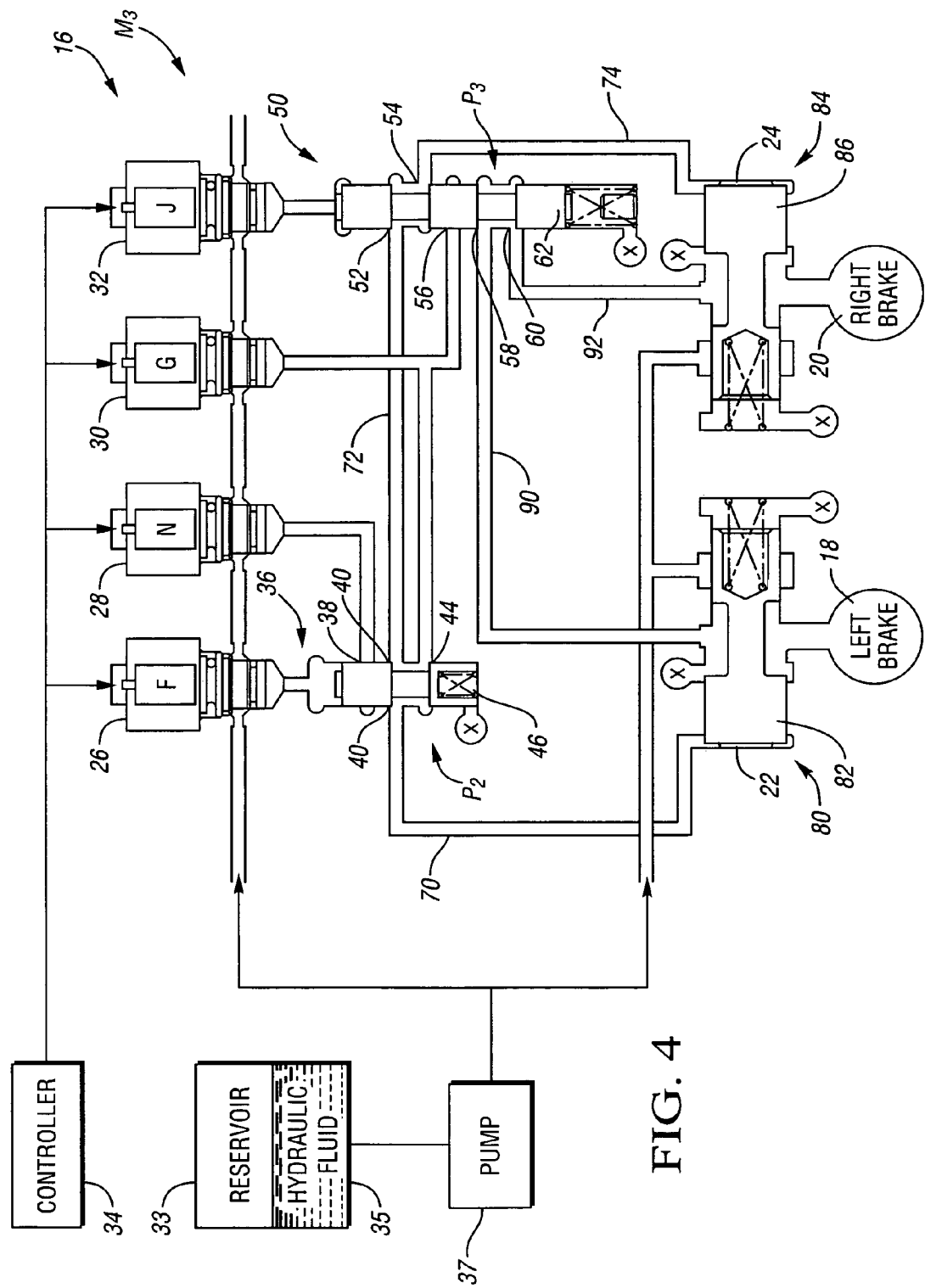
FIG. 4 is a schematic diagram of a tracked vehicle braking system in a third operational mode.

Referring to FIG. 4, a third operational mode M3 of the brake system 16 is shown. If the solenoid 28 fails and thereby impairs the operation of the brake system 16 in the first operational mode M1 (shown in FIG. 2), the third operational mode M3 may be commanded by the controller 34 to correct the brake system 16. Failure of the solenoid 28 may be identified, for example, by the controller 34 in response to a signal from the vehicle operator or from on-board diagnostic equipment (not shown). In mode M3, the solenoid 26 transmits pressurized hydraulic fluid 35 to actuate the selector valve assembly 36 such that the control piston 46 is translated into the actuated position P2, and the solenoid 32 is off such that the control piston 62 of the splitter valve assembly 50 remains in the steady state position P3.

In the third operational mode M3 of the hydraulic brake system 16, the failed solenoid 28 is functionally replaced by the solenoid 30 such that the solenoid 30 controls both the left and right brakes 18, 20. More precisely, the solenoid 30 transfers pressurized hydraulic fluid 35 into the inlet port 44 of the selector valve assembly 36; through the selector valve assembly 36; and out the outlet ports 40 of the selector valve assembly 36. The pressurized hydraulic fluid 35 transferred out of the outlet port 40 is transferred via the left apply channel 70 to the left brake regulator inlet port 22 to actuate the left brake 18. The pressurized hydraulic fluid 35 transferred out of the outlet port 40 is also transferred through the connector channel 72; into the inlet port 52 of the splitter valve assembly 50; out of the outlet port 54 of the splitter valve assembly 50; through the right apply channel 74; and to the right brake regulator inlet port 24 such that the right brake 20 is actuated.

As shown in FIG. 4, the inlet/outlet ports 58 and 60 are in fluid communication with each other and thereby establish fluid communication between the left and right brake regulator valves 80, 84 via the equalization channels 90, 92 to equalize any pressure differential between the left and right brakes 18, 20. Therefore, in the third operational mode M3 of the hydraulic brake system 16, the solenoid 30 transfers pressurized hydraulic fluid 35 to both the left and right brake regulator inlet ports 22, 24 at a common pressure such that the left and right brakes 18, 20 generate a substantially similar brake force respectively applied to the left and right tracks 12, 14 (shown in FIG. 1).

While the best modes for carrying out the invention have been described in detail, those familiar with the art to which this invention relates will recognize various alternative designs and embodiments for practicing the invention within the scope of the appended claims.

The invention claimed is:

1. An apparatus for brake steering a tracked vehicle, said apparatus comprising:
    a controller;
    a circuit selector actuator operatively connected to the controller;
    a valve in fluid communication with the circuit selector actuator, said valve being configured to select a predefined operational mode;
    a plurality of brake apply actuators operatively connected to the controller;
    a left brake operatively connected with a left track, said left brake in fluid communication with one of said plurality of brake apply actuators; and
    a right brake operatively connected with a right track, said right brake in fluid communication with another of said plurality of brake apply actuators;
    wherein at least one of the plurality of brake apply actuators is configured to selectively apply the left and right brakes during normal operation of the tracked vehicle; and
    wherein said controller is configured to control said plurality of brake apply actuators to independently apply said left brake and said right brake such that the tracked vehicle can be turned in a desired manner.

2. The apparatus of claim 1, further comprising a reservoir in fluid communication with said circuit selector actuator, said plurality of brake apply actuators, said left brake, and said right brake; and a pump configured to selectively provide pressurized hydraulic fluid from said reservoir to one or more of the circuit selector actuator, the plurality of brake apply actuators, the left brake, and the right brake.

3. The apparatus of claim 1, wherein activation of said circuit selector actuator changes said predefined operational mode of said valve.

4. The apparatus of claim 1, wherein said circuit selector actuator and said plurality of brake apply actuators are solenoids.

5. The apparatus of claim 4, further comprising a left apply channel operatively connected to the left brake; and a right apply channel operatively connected to the right brake.

6. The apparatus of claim 5, further comprising a left brake regulator inlet port operatively connected to the left brake; and a right brake regulator inlet port operatively connected to the right brake.

7. The apparatus of claim 1, further comprising an equalization channel selectively fluidly communicating the left brake with the right brake, wherein said equalization channel equalizes a pressure differential between the left and right brakes when fluidly communicating the same.

8. The apparatus of claim 1, wherein activation of said circuit selector actuator switches said left brake fluid communication from a first of said plurality of brake apply actuators to a second of said plurality of brake apply actuators.

9. The apparatus of claim 8, wherein activation of said second circuit selector actuator switches said right brake fluid communication from a first of said plurality of brake apply actuators to a second of said plurality of brake apply actuators.

10. The apparatus of claim 1, further comprising:
a second circuit selector actuator operatively connected to the controller; and
a second valve in fluid communication with the second circuit selector actuator, said second valve being configured to select a predefined operational mode;
wherein activation of said second circuit selector actuator changes said predefined operational mode of said second valve.

11. The apparatus of claim 1, wherein said plurality of brake apply actuators includes a first and a second brake apply actuator, wherein the left and right brakes are in fluid communication with the first brake apply actuator when the circuit selector actuator is in a deactivated state, and wherein the left and right brakes are in fluid communication with the second brake apply actuator when the circuit selector actuator is in an activated state.

* * * * *